April 23, 1940. C. C. FARMER 2,198,033
INERTIA TYPE BRAKE CONTROL MEANS
Filed July 16, 1938 2 Sheets-Sheet 2
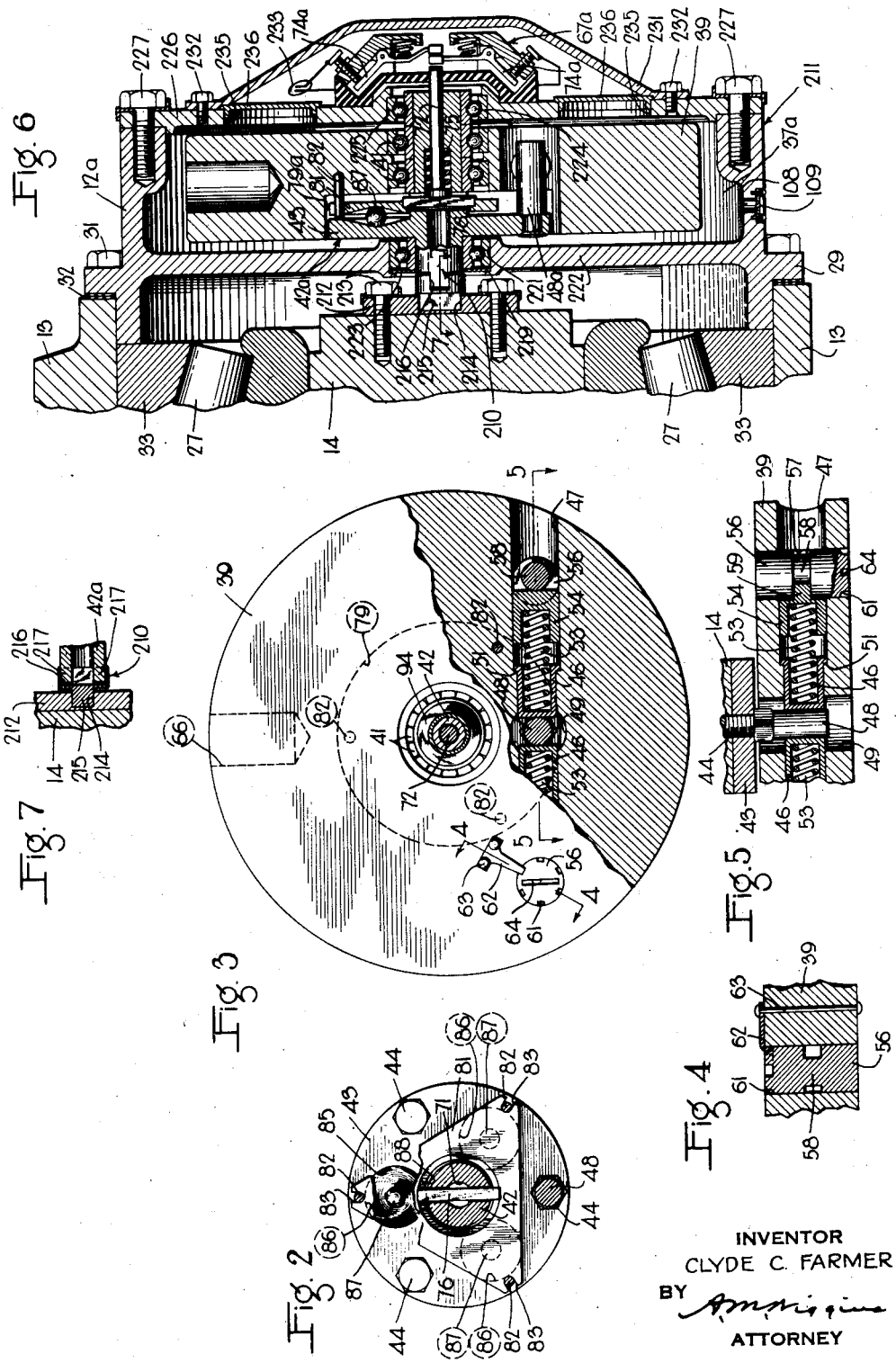
INVENTOR
CLYDE C. FARMER
BY
ATTORNEY Patented Apr. 23, 1940

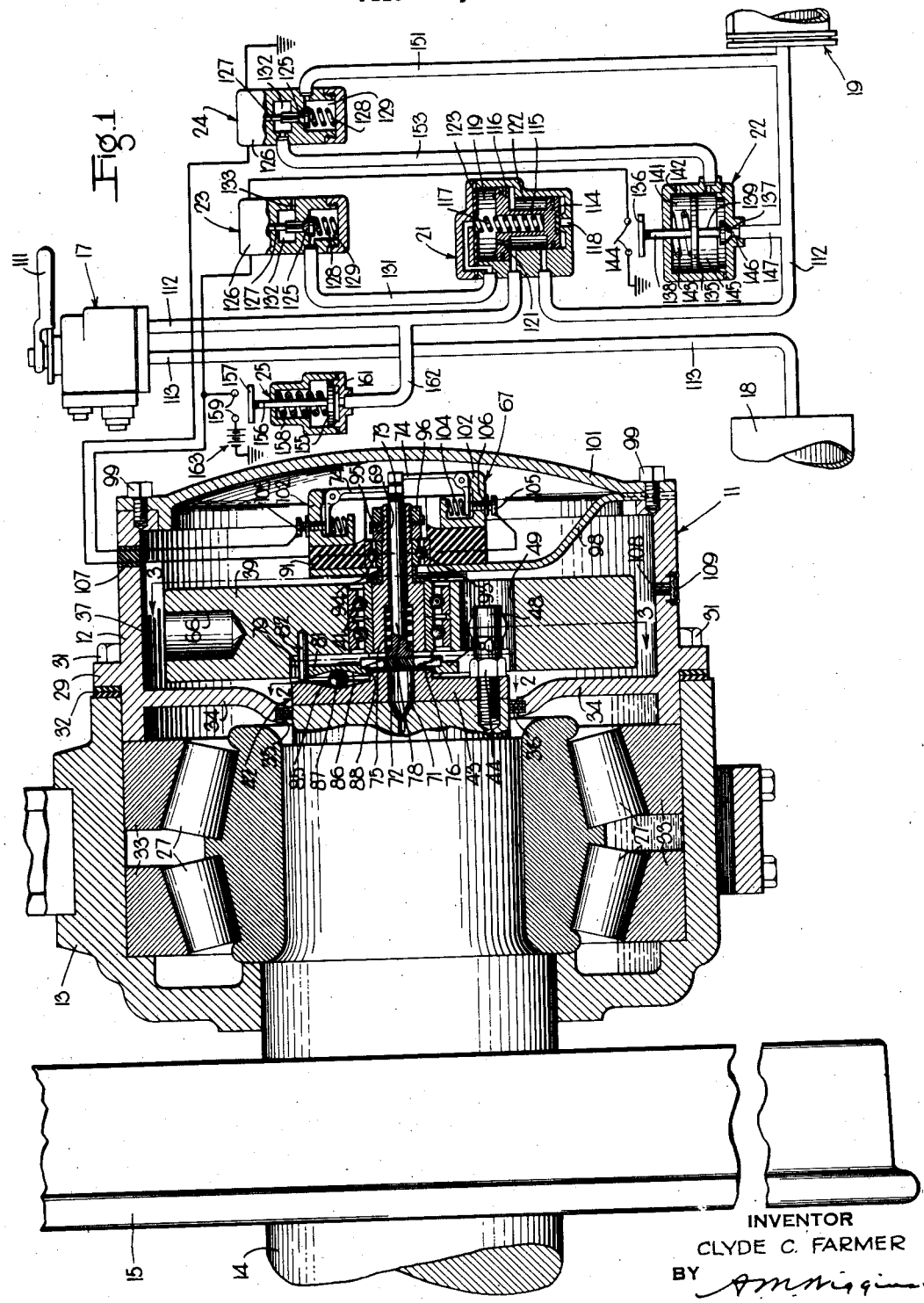

2,198,033

UNITED STATES PATENT OFFICE 2,198,033

INERTIA TYPE BRAKE CONTROL MEANS

Clyde C. Farmer, Pittsburgh, Pa., assignor to The Westinghouse Air Brake Company, Wilmerding, Pa., a corporation of Pennsylvania Application July 16, 1938, Serial No. 219,616

12 Claims. (Cl. 200—52)

This invention relates to inertia type brake control means for vehicles such as railway cars and trains and has particular relation to a rotary inertia means associated with individual wheels or axle units for so controlling the brakes associated with the wheels or axle units as to prevent sliding thereof.

When a force retarding rotation of a vehicle wheel is exerted thereon which is sufficient to exceed the limit of adhesion or rolling friction between the wheel and the road surface or rail on which the wheel rolls, the wheel decelerates at a rapid rate to a non-rotative or locked state while the vehicle or car continues to travel in its direction of motion. The dragging of a vehicle or car wheel along a road surface or rail in a locked state is referred to herein as "sliding" or a "sliding condition" of the wheel.

If the braking force retarding the rotation of the vehicle or car wheel is immediately and rapidly reduced at the instant that a wheel begins to rotate at a speed less than a speed corresponding to vehicle or rail speed, the wheel will cease deceleration and accelerate back toward a speed corresponding to vehicle or rail speed before actually attaining the locked state. The rotation of a vehicle wheel at a speed less than a speed corresponding to vehicle or rail speed at the same instant is referred to herein as "slipping" or a "slipping condition" of the wheel as distinguished from a sliding condition.

Various types of rotary inertia devices associated with individual wheels or axle units have been proposed for instantly and rapidly releasing the brakes on a car wheel at the instant it begins to slip, and thus guarding against sliding of the wheels, which is objectionable because of the development of flat spots on the wheels and the necessity for repair or replacement of the wheels. In my copending application Serial No. 137,956, filed April 20, 1937, now Patent 2,140,620, assigned to the assignee of this application, a rotary inertia device of this character is disclosed and claimed.

In prior known car brake control equipment having rotary inertia devices for guarding against sliding of the individual wheels or wheel-and-axle units, the inertia devices are driven from an axle by an endless chain or belt or from any other rotatable element which rotates according to the speed of rotation of a wheel axle, such as the armature shaft of the lighting generator. In such cases, the rotary inertia devices are located in relatively inaccessible locations under the floor of each vehicle or car, thereby making it difficult to readily inspect, adjust, repair and replace.

It is an object of my invention to provide a rotary inertia device of the character above indicated which is of improved design and which is relatively small and compact.

Another object of my invention is to provide a rotary inertia device for guarding against sliding of the individual wheels or pairs of wheels on the vehicle or car and adapted to be mounted at the end of a wheel axle, in a manner to constitute an extension of the axle journal housing, where it is readily accessible for inspection, servicing repairs or replacement.

A further object of my invention is to provide a rotary inertia device of the character indicated in the foregoing objects adapted to be embodied in a unitary casing which may be readily substituted as a unit for the usual cover plate at the end of an axle journal housing, whereby the brake control functions of the rotary inertia device may be embodied in a conventional brake equipment with a minimum of effort and cost.

The above objects and other objects of my invention which will be made apparent hereinafter, are attained in the manner to be subsequently described and indicated in the accompanying drawings wherein Fig. 1 is a view, mainly in vertical section, of one embodiment of my invention, together with a simplified diagrammatic representation of a brake control equipment with which it is associated, Figs. 2 and 3 are sectional views, taken on the lines 2—2 and 3—3, respectively, of Fig. 1, Figs. 4 and 5 are fragmental sectional views, taken on the lines 4—4 and 5—5, respectively, of Fig. 3, Fig. 6 is a fragmental vertical sectional view showing another embodiment of my invention, and Fig. 7 is a fragmental sectional view, taken on the line 7—7 of Fig. 6.

*Description of equipment shown in Fig. 1*

Referring to Fig. 1, there is shown a rotary inertia device 11 having a tubular casing 12 which is adapted to replace the usual cover plate at the outer end of the journal housing 13 for a wheel-and-axle unit including an axle 14 and a pair of wheels 15, only one of which is shown. The rotary inertia device 11 may be employed in any type of brake control equipment and, for purposes of illustration, it is shown as employed in connection with a brake control equipment of the character disclosed in my copending application, Serial No. 209,648, filed May 24, 1938 and assigned to the assignee of this application.

The brake control equipment, which it should be understood is shown in simplified form, may comprise a manually operable self-lapping brake valve 17, a source of fluid under pressure such as the usual main reservoir 18 located on the control car or locomotive of the train, a brake cylinder 19, one or more of which may be provided for each individual axle or plurality of axles, a release and reapplication valve device 21 hereinafter called the release valve, a pressure operated switch device 22, two magnet valve devices 23 and 24, respectively, and a pressure operated switch 25.

Considering the parts of the equipment in greater detail, the rotary inertia device 11 is shown as applied to the journal housing 13, which for purposes of illustration is shown as of the roller bearing type having two adjacent rings of tapered roller bearings 27. It should be understood, however, that the type of journal housing is immaterial as my rotary inertia device may be attached to any type of journal housing.

As shown in Fig. 1, the tubular casing 12 of the rotary inertia device 11 has an annular flange 29 adapted to be secured to the outer end of the journal housing 13 by the same screws 31 as is the conventional cover plate for the journal housing. As in the case of the conventional end or cover plate, a suitable number of shims 32 of ring-shape are interposed between the flange 29 and the end of the journal housing to provide suitable adjustment for the roller bearings 27. The inner end of the casing 12 extends into and fits closely within the end opening of the journal housing and is adapted to engage the outer bearing ring 33 with which the roller bearings 27 are in contact, thereby providing the proper adjustment of the roller bearings in accordance with the number of shims 32.

Formed integrally with and within the tubular casing 12 is a partition or wall 34 which has a central opening 35 therein through which the end of the axle 14 extends. An annular packing of suitable material, such as laminations of felt, is inset in an annular groove formed in the wall 34 at the opening 35 for engaging the outer periphery of the axle 14 to form a seal to prevent the passage of oil, a supply of which is contained in the lower portion of the journal housing for lubricating the roller bearings, along the axle into the chamber 37 formed in the tubular casing 12 at the outer side of the wall 34. The purpose of preventing the passage of oil into the chamber 37 will be made apparent hereinafter.

The rotary inertia device 11 further comprises a dynamically balanced inertia element in the form of a fly-wheel 39 which is rotatively mounted by anti-friction bearings, such as roller bearings 41, on a spindle 42 having at one end thereof a disc-shaped flange 43 that is secured in coaxial relation to the axle 14 at the outer end thereof by a plurality of screws 44 (see Fig. 2).

The fly-wheel 39 is arranged to be driven by the axle 14 through a resilient connection formed as by two oppositely biased plungers or stops 46 (see Fig. 3) contained in a suitable chordal bore 47 in the fly-wheel, between the inner ends of which stops there extends a pin 48 formed integrally with the head of one of the screws 44. The fly-wheel 39 has a suitable bore or passage 49 therein which extends through the fly-wheel in parallel spaced relation with respect to the axis of the fly-wheel and which intersects the bore 47, to provide passage for the pin 48. The bore 49 is larger in diameter than the pin 48 to permit relative rotary displacement between the fly-wheel and the axle.

As seen in Figs. 3 and 5, the diameter of the bore 47 at the two outer ends thereof is larger than the diameter at the mid-portion intersected by the bore 49 thereby forming an annular stop shoulder 51 on opposite sides of the bore 49 which is adapted to be engaged by outwardly extending flanges on the plungers 46 to limit the inward movement of the plungers. The location of the shoulders 51 is such that, with plungers 46 shifted inwardly to the extent permitted by the shoulders, the inner ends of the plungers just contact opposite sides of pin 48 to prevent any loose relative rotary movement between the fly-wheel 39 and the axle 14.

Each of the plungers 46 is yieldingly urged inwardly into engagement with the corresponding shoulder 51 by a coil spring 53 which is interposed between the plunger 46 and a cam follower 54 which is in the form of a piston that operates in the outer end portion of the bore 47. The plungers 46 and the cam followers 54 are suitably recessed to receive the opposite ends of the spring 53, respectively, to suitably support and hold it in position.

The position of the cam followers 54 in the bore 47 determines the degree of tension of the spring 53 which, in turn, varies the yielding force effective to resist relative movement between the fly-wheel 39 and the axle 14 when the axle and fly-wheel tend to rotate at different speeds in the manner to be hereinafter more clearly pointed out.

The position of each cam follower 54 in the bore 47 is adjusted by means of a corresponding cam element 56, in the form of a rotary stem, which fits closely in a bore or passage 57 that extends in parallel spaced relation to the axis of the fly-wheel and intersects the bore 47. Midway of the ends of the cam element 56 is a cylindrical cam surface 58 of reduced diameter, eccentric to the axis of the cam element 56 and adapted to be engaged by a tongue 59 of corresponding width on the outer end of the cam follower 54.

As shown in Fig. 3, the cam surface 58 is in the position to permit maximum outward movement of the cam follower 54 in bore 47, thereby relaxing the tension of the biasing spring 53 a maximum amount. Rotation of the cam element 56 in either direction from the position shown in Figs. 3 and 5 causes inward shifting of the cam follower 54 and a consequent increase in the biasing force of the spring 53.

It is essential that the degree of biasing force or tension of the springs 53 be accurately controlled and adjusted in order to insure that relative rotary movement between the fly-wheel and axle occur only when the rate of rotative deceleration or acceleration exceeds a certain uniform rate occurring only when the wheels 15 slip. Accordingly, the outer end of the cam element 56 is provided with accurately spaced notches 61 into which the downwardly curved ends of a spring clip 62, that is secured to the outer face of the fly-wheel as by rivets 63 extending through the fly-wheel, is adapted to extend. Rotation of the cam element 56 may be effected by means of a suitable instrument, such as a screw-driver, which may be inserted in a suitable slot 64 formed in the same end of the cam element as are the notches 61.

It will thus be seen that the cam element 56 is yieldably locked in any one of a plurality of fixed positions so that the tension of the spring 53 associated with each cam follower and plunger 46 on opposite sides of the pin 48 may be uniformly adjusted.

It should be understood, however, that the springs 53 on opposite sides of the pin 48 need not necessarily be adjusted to the same tension in all cases. For example, if the car or train of cars to which the rotary inertia device 11 is applied travels always in one direction, that is, when a certain end of a car or train always leads, the springs 53 need not necessarily be adjusted to the same tension. Further reference to the adjustment of the springs 53 will be made hereinafter.

In order to compensate for the removal of the material of which the fly-wheel 39 is made in providing the bores or passages 47, 49 and 57, and thus to dynamically balance the fly-wheel 39, material is likewise removed from the periphery of the fly-wheel as by drilling a suitable bore 66.

The fly-wheel 39 and the axle 14 are related in the manner presently to be described so that upon occurrence of relative rotary movement between the fly-wheel and the axle, operation of a switch device 67 is effected. To this end, the spindle 42 is provided with a longitudinal bore 69 at the outer end thereof and a counterbore 71 of larger diameter at the inner end thereof, a plunger 72 being received in the bore and counterbore and having a head portion and a shank portion respectively fitting and operating in the counterbore and bore. The outer end of the plunger 72 has an end tip of insulating material 73 suitably secured thereto, for a purpose hereinafter made apparent, and is adapted to shift two pivoted contact levers 74 of the switch device 67 into contact with each other, the levers being normally disengaged from each other.

A coil spring 75 interposed in the counterbore 71 between the head of the plunger 72 and the shoulder formed between the counterbore 71 and bore 69 yieldingly urges the plunger 72 inwardly toward the outer end of the axle. Inward movement of the plunger 72 under the influence of the spring 75 is limited by the engagement of the head of the plunger with a pin 76 which extends through a transverse slot 78, in the spindle 42, that intersects the counterbore 71 adjacent the end flange 43.

The face of the fly-wheel 39 adjacent the end flange 43 of the spindle 42 has a circular recess 79 therein slightly larger in diameter than the end flange 43, in which recess 79 is received a triangular plate 81 (see Fig. 2) that is adapted to rotate with the fly-wheel by means of pins 82 fixed in the fly-wheel and engaging in suitable slots 83 formed in the triangular plate 81 at the three apexes thereof. The plate member 81 always rotates with the fly-wheel 39 but is shiftable in the recess 79 axially with respect to the fly-wheel on the pins 82.

Formed in the adjacent faces of the triangular plate 81 and the flange 43 of the spindle 42 are a plurality of pairs of complementary recesses 85 and 86 of shallow conical contour. Any suitable number of pairs of complementary recesses 85 and 86 may be provided in the end flange 43 and plate 81, only three being shown for purposes of illustration. Interposed between the end flange 43 and the plate 81 and contained in the pocket formed by each pair of complementary recesses 85 and 86 is a steel ball 87.

The triangular plate 81 has a central opening 88, through which the shank of the spindle 42 extends, the opening 88 being counterbored on the face of the triangular plate 81 opposite the recesses 86 to form a recessed seating surface on the triangular plate 81 for receiving the pin 76 and preventing it from sliding transversely out of the slot 78 in the spindle 42.

It will be seen that spring 75 acts through the plunger 72 and pin 76 to yieldingly bias the plate 81 in the direction of the flange 43 on the spindle into contact with the steel balls 87. With the fly-wheel 39 and axle 14 held in their normal relative rotary positions by springs 53, the steel balls 87 are thus held between the plate 81 and flange 43 at the deepest point of the complementary recesses 85 and 86.

When the axle 14 decelerates rotatively at a rate in excess of a certain rate, determined by the resisting force or tension of either one of the springs 53, and occurring only when the wheels 15 slip, the fly-wheel 39 shifts rotatively relative to the axle 14, in a leading direction. When the axle accelerates rotatively at a rate in excess of a certain rate determined by the tension of either of the springs 53, the fly-wheel shifts rotatively relative to the axle in a lagging direction. Upon rotary movement of the fly-wheel relative to the axle 14 in either a leading or a lagging direction, the cooperation of the steel balls 87 with the sloping surfaces in the complementary recesses 85 and 86 causes the triangular plate 81 to be shifted axially towards the fly-wheel, in the right-hand direction as seen in Fig. 1, against the yielding opposing force of the spring 75. The movement of the triangular plate 81 in the right-hand direction is effective, through the pin 76, to shift the plunger 72 in the right-hand direction, the maximum degree of outward movement of the plunger 72 being limited by the engagement of the pin 76 with the end of the slot 78 in spindle 42.

The switch device 67, previously mentioned comprises a base member 91 of insulating material that is rotatably supported on spindle 42, as by a ball bearing 93 provided in a central axial bore or passage in the base member through which the outer end of the spindle 42 extends. A spacing ring 94 is provided on the spindle 42 between the fly-wheel and the base member 91 of the switch device 67 and a suitable nut 95 and lock nut 96 are provided on the outer threaded end of the spindle 42 for holding the base member 91 in position on the spindle.

The base member 91 of the switch device 67 is held against rotation by means of a strap 98 fixed at one end to the base 91 and at the other end to the tubular casing 12. As shown illustratively in Fig. 1, the strap 98 has a hole in the end thereof through which one of the screws 99 holding an end or cover plate 101 to the outer end of the tubular casing 12 extends, the end of the strap 98 being securely held between the end plate 101 and the end of the tubular casing 12.

The pivoted contact levers 74 of the switch device 67 are pivoted individually on separate metallic supporting brackets 102 suitably fixed or attached to the insulating base 91. The contact levers 74 are in the form of bell cranks having two arms at an angle to each other, the outer end of one arm, hereafter called the contact arm, being formed as a contact member, and the outer end of the other arm being arranged to be acted upon by a coil spring 104 interposed between the bracket and the arm which urges the arm into contact with the end of a stop screw 105 screwed into the bracket 102. A nut 106 is provided on the stop screw 105 to lock it in a desired position and thus determine the normal position of the contact end of the other arm of the lever.

The two brackets 102 are displaced axially along the axis of the spindle 42 so that the contact arm of one lever 74 is axially spaced from and out of engagement with the contact arm of the other lever 74, the two contact arms of the levers 74 being in line with and close to the insulated tip 73 of the plunger 72. Thus, when the plunger 72 is shifted in the right-hand direction against the yielding force of the spring 75, the contact arm of one of the levers 74 is shifted yieldingly into engagement with the other.

Switch device 67 is arranged to control electrical circuits, hereinafter to be described, the connection of the circuit wires to the contact levers 74 being made as by attachment to the adjusting stop screws 105 in the manner shown, or in any other suitable manner. The circuit wires may enter the tubular casing 12 through an opening in the wall of the casing having an insulating element 107 for supporting the wires in the opening and at the same time preventing the entry of dirt or dust therethrough.

It is essential for proper and reliable operation of the rotary inertia device that the fly-wheel 39 rotate fully in air and accordingly the packing ring 36 is provided to prevent entry of liquid lubricant from the journal housing 13 into the chamber 37 containing the fly-wheel. In order to prevent the accumulation of lubricant that might possibly enter chamber 37 due to failure of the packing ring 36 and thus prevent the fly-wheel 39 from running in liquid lubricant, a drain port 108 is provided in the lower wall of the tubular casing which may be covered by a fine mesh screen 109, as shown, to prevent entry of foreign particles such as dirt, into the chamber 37.

The self-lapping brake valve 17 is of the type described in detail and claimed in Patent No. 2,042,112 of Ewing K. Lynn and Rankin J. Bush and accordingly only a functional description thereof is given herein. The brake valve 17 has an operating handle 111 which is shiftable in a horizontal plane from a normal position into an application zone. With the operating handle 111 in its normal or release position, the brake cylinder 19 is vented to atmosphere at the brake valve through a pipe 112 hereinafter called the straight-air pipe. When the operating handle 111 is shifted into the application zone, fluid under pressure is supplied from the main reservoir 18 through a supply pipe 113 to the straight-air pipe 112 and connected brake cylinder 19 to establish a pressure therein substantially proportional to the degree of displacement of the operating handle out of its release position. If the pressure in the straight-air pipe 112 reduces or tends to reduce, due to leakage or as hereinafter described, brake valve 17 operates automatically to supply fluid under pressure into the straight-air pipe to maintain or reestablish a pressure corresponding to the position of the brake valve handle 111 in the application zone.

The release valve 21 is of well known construction, being of a conventional type employed in modern high speed railway brake equipment. It comprises briefly a casing containing a vent valve 114 which is connected by a stem 115 to an operating piston 116. Normally the operating piston 116 and vent valve 114 are urged downwardly by a coil spring 117, interposed between the casing and the piston, to a position in which the vent valve 114 seats on an annular rib seat to close an exhaust port 118 and at the same time establish communication between one section of the straight-air pipe 112 connected to the brake valve 17 and another section leading to the brake cylinder. Formed in the casing above the operating piston 116 is a chamber 119 which is in communication through a restricted port 121 in the piston with the annular chamber 122 formed between the operating piston and the vent valve and into which the two sections of the straight-air pipe open.

The spring 117 is of such strength, and the size of the restricted port 121 of the piston 116 is such, that when fluid under pressure is supplied into the straight-air pipe 112 under the control of the brake valve 17, the operating piston and vent valve remain in the normal position shown. Fluid under pressure supplied through the straight-air pipe 112 to the brake cylinder flows through the restricted port 121 in the piston 116 to the chamber 119 so that the chamber 119 becomes promptly charged to the pressure in the straight-air pipe.

If, while the straight-air pipe 112 and the brake cylinder 19 are charged with fluid under pressure, the chamber 119 is rapidly vented, the differential force of the fluid pressure on the lower face of the piston 116 over that on the upper face shifts the piston upwardly and into seated engagement on a gasket seat 123. The vent valve 114 is correspondingly shifted upwardly to a position interrupting the connection between the two sections of the straight-air pipe and connecting that section of the straight-air pipe 112 between the release valve 21 and brake cylinder 19 to atmosphere through the exhaust port 118. When the piston 116 is seated on the gasket seat 123, fluid under pressure continues to leak to a negligible degree through the restricted port 121 in the piston to the chamber 119. Due to the pressure maintaining feature of the brake valve 17, however, no diminution of the pressure in the section of the straight-air pipe 112 between release valve 21 and brake valve 17 occurs.

Magnet valve device 23 is provided for establishing an exhaust communication for the chamber 119 of the release valve 21. Magnet valve device 23 comprises a casing embodying a valve 125 of the poppet type and an electromagnet winding or solenoid 126 effective when energized to actuate a plunger or stem 127 to unseat the valve 125 from its seated position on an associated valve seat, formed on the casing, against the yielding resistance of a coil spring 128. The valve 125 is contained in a chamber 129 which is constantly connected to the chamber 119 of the release valve 21, as by a pipe 131. When the valve 125 is unseated, communication is established from the chamber 119 through pipe 131, chamber 129, past the valve 125, to a chamber 132 which is constantly open to the atmosphere through an exhaust port 133. With the valve 125 seated, this exhaust communication is closed.

The pressure operated switch device 22 comprises a casing containing a piston 135 adapted to operate a switch contact member 136 and a valve 137 of the poppet type. In the form shown, the piston 135 has a stem 138 at one side thereof to which the switch member 136 is fixed in insulated relation and a stem 139 on the opposite side thereof on which valve 137 is fixed. Interposed between the casing and the upper face of the piston 135, in a chamber 141 which is constantly open to atmosphere through an exhaust port 142, is a coil spring 143 which yieldingly urges the piston downwardly to a normal position in which switch member 136 disengages a pair of associated fixed contact fingers 144 and in which the valve 137 is seated on an associated valve seat. The valve 137 controls communication through a port 146 and a branch pipe 147 between a chamber 145, formed in the casing at the lower side of the piston 135 and that section of the straight-air pipe 112 between the release valve 21 and the brake cylinder 19, the branch pipe 147 being connected to the straight-air pipe 112 at a point adjacent the brake cylinder.

The inner seated area of the valve 137 is of relatively small area and the strength of the spring 143 is such that normally the maximum pressure of the fluid supplied into the straight-air pipe 112 and brake cylinder 19 is unable to overcome the spring and unseat the valve. In order to effect operation of the switch member 136 and valve 137, the magnet valve 24 is provided for supplying fluid under pressure to the chamber 145 from the straight-air pipe 112 at a point adjacent the brake cylinder 19. The area of the piston 135 is relatively large compared to the area of the valve 137 and thus a fluid pressure, which is ineffective to unseat the valve 137 when acting solely on the inner seated area thereof, is effective when acting on the piston 135 to urge the piston upwardly and thereby effect unseating of the valve 137 and engagement of the switch member 136 with the contact fingers 144.

Once the valve 137 is unseated, direct communication between the straight-air pipe 112 and connected brake cylinder 19 with the chamber 145 is established through port 146 and branch pipe 147, and thus the piston 135 is thereafter maintained in a raised position as long as the pressure of the fluid in the chamber 145 exerts a sufficient force on the piston to overcome the spring 143. The area of the piston 135 is such in relation to the strength of the spring 143 as to maintain the valve 137 unseated and the switch member 136 in engagement with the contact fingers 144 as long as the pressure in the chamber 145 exceeds a predetermined low pressure, such as five pounds per square inch.

The piston 135 has a relatively loose fit to prevent undesired build-up of pressure in the chamber 145 and consequent undesired operation of the switch device 22 in the event of leakage past the valve 137, any possible fluid under pressure which may enter the chamber 145 escaping past the piston to the atmospheric chamber 141.

The magnet valve 24 is similar to the magnet valve 23 and accordingly no description thereof is deemed necessary, corresponding parts of the magnet valves being identified by the same reference numerals. The chamber 129 containing the valve 125 of the magnet valve device 24 is connected by a branch pipe 151 to the straight-air pipe 112 at a point adjacent the brake cylinder 19 and the chamber 132 is connected by a pipe 153 to the chamber 145 beneath the piston 135 of the pressure switch 22.

With the straight-air pipe 112 and brake cylinder 19 charged with fluid under pressure, the energization of the magnet winding 126 of the magnet valve device 24 effects unseating of the valve 125 and the consequent supply of fluid under pressure from the brake cylinder and straight-air pipe through the pipe 151, chamber 129, past the unseated valve 125, chamber 132 and pipe 153 to the chamber 145 of the pressure switch 22, thereby effecting operation thereof to engage the switch member 136 with the contact fingers 144 and unseat the valve 137.

When the electromagnet winding 126 of the magnet valve device 24 is deenergized, the valve 125 is reseated to cut off the supply of fluid under pressure therepast to the chamber 145. As previously pointed out, however, once the valve 137 is unseated, the pressure in the straight-air pipe 112 and brake cylinder 19 maintains the piston 135 in raised position as long as the pressure exceeds a certain low pressure, such as five pounds per square inch. Thus it will be seen that the electromagnet winding 126 of the magnet valve device 24 need only be momentarily energized to effect the operation of the pressure switch device 22, since the return of the pressure switch to its normal position is controlled by the pressure in the chamber 145 independently of the deenergization of the electromagnet winding of the magnet valve device 24.

The pressure switch 25 is diagrammatically shown as comprising a casing containing a piston 155 having a stem 156 carrying in insulated relation thereon a switch member 157. At one side of the piston 155, in interposed relation between the piston and the casing, is a coil spring 158 which normally yieldingly urges the piston downwardly to a limit position in which the switch member 157 is out of engagement with a pair of associated fixed contact fingers 159. On the opposite side of the piston to the spring 158 is a chamber 161 which is constantly connected through a branch pipe 162 to that section of the straight-air pipe 112 between the release valve 21 and the brake valve 17.

The strength of the spring 158 is such as to maintain the switch member 157 out of engagement with its associated contact fingers 159 as long as the pressure of the fluid supplied into the straight-air pipe 112 and acting in chamber 161 on the piston 155 does not exceed a predetermined low pressure such as five pounds per square inch. When the pressure of the fluid supplied into the straight-air pipe 112 exceeds such pressure, the spring 158 yields to permit upward movement of the piston to effect engagement of the switch member 157 with its associated contact fingers 159.

Energization of the respective electromagnet windings 126 of the magnet valve devices 23 and 24 is effected by current supplied from a suitable source, such as a storage battery 163, which may be the storage battery for the lighting system of the car. The circuits for controlling the magnet valve devices 23 and 24 are simple in character and readily apparent from the drawings and should accordingly need no specific description except to point out that the electromagnet winding 126 of the magnet valve device 23 is jointly controlled by the series-connected pressure switches 22 and 25 while the electromagnet winding 126 of the magnet 24 is jointly controlled by the series-connected pressure switch 25 and switch device 67 of the rotary inertia device 11.

*Operation of equipment shown in Fig. 1*

Let it be assumed that with the main reservoir 18 charged with fluid under pressure to the normal pressure carried therein as from a fluid compressor, not shown, and with the car or train of cars traveling along the road under power or coasting, the operator desires to effect an application of the brakes. In such case the operator shifts the brake valve handle 111 from release position into the application zone, after first cutting off the propulsion power if the power is on, the degree of shifting of the handle 111 into the application zone being according to the desired degree of application. Fluid under pressure is accordingly supplied to the brake cylinder to effect application of the brakes associated with the axle 14 and wheel 15.

If the degree of application of the brakes is such as not to cause slipping of the vehicle wheels 15 and axle 14, the contact levers 74 of the switch device 67 of the rotary inertia device 11 remain disengaged from each other for the reason that one of the springs 53 which sustains the torque force applied from the axle 14 to the fly-wheel 39 holds the fly-wheel in its normal position with respect to the axle 14 as long as the wheels do not slip.

If the axle 14 and associated wheels 15 slip, however, due to the application of the brakes, the fly-wheel 39 tends to continue at the original speed while the axle decelerates rapidly and accordingly the fly-wheel 39 is shifted to a leading position rotarily with respect to the axle, thus resulting in the shifting of the plunger 72 in the right-hand direction to effect enegagement of the contact levers 74 of the switch device 67.

The pressure switch 25 having already been operated to circuit-closing position due to the pressure of the fluid in the straight-air pipe 112, the engagement of the contact levers 74 of the switch device 67 completes the circuit for energizing the electromagnet winding 126 of the magnet valve device 24, which accordingly operates to supply fluid under pressure to the chamber 145 of the pressure switch 22. Pressure switch 22 is accordingly operated to effect engagement of its switch member 136 with the associated contact fingers 144 and to unseat the valve 137. With pressure switch 25 already in circuit-closing position, the engagement of the switch member 136 of the switch device 22 with its associated contact fingers 144 completes the circuit for energizing the electromagnet winding 126 of the magnet valve device 23, which is accordingly operated to vent the chamber 119 of the release valve 21.

The release valve 21 is accordingly operated to cut off the connection between the two sections of the straight-air pipe 112 and vent brake cylinder 19 to atmosphere through the exhaust port 118 at a rapid rate.

Due to the rapid venting of fluid under pressure from the brake cylinder 19 practically instantaneously upon the initiation of slipping of the vehicle wheels 15 and axle 14 and the consequent reduction in the degree of application of the brakes associated with the wheels, the wheels cease deceleration at the excessive rate incidental to slipping and begin to accelerate rapidly back toward a speed corresponding to car or rail speed. In view of the fact that the weight of a car wheel or wheel and axle unit is relatively small compared to the weight of the car, the rate of acceleration of the wheels and axle back toward a speed corresponding to vehicle or rail speed is exceedingly rapid, being at least as great as the rate of deceleration in slipping.

Accordingly, it will be seen that as a result of the reduction in the rate of deceleration and the subsequent acceleration of the axle and wheels, the axle 14 overtakes and tends to overspeed the fly-wheel 39. The fly-wheel 39 accordingly shifts rotarily from a leading position with respect to the axle back to its normal position and then to a lagging position with respect to the axle. The momentary return of the fly-wheel 39 to its normal position results in the momentary separation of the contact levers 74 of the switch device 67 and the consequent deenergization of the electromagnet winding 126 of the magnet valve device 24.

However, since the valve 137 of the pressure switch 22 is unseated and communication established therepast from the straight-air pipe 112 and brake cylinder 19 to the chamber 145, the momentary deenergization of the magnet winding 126 of magnet valve 24 is without effect, because the pressure remaining in the brake cylinder and the connected section of the straight-air pipe 112 still remains sufficiently high to maintain the valve 137 unseated and the switch member 136 in contact with its associated contact fingers 144. It will thus be seen that once the pressure switch 22 is operated by the engagement of the contact levers 74 of the switch device 67 of the rotary inertia device 11, the pressure switch 22 is thereafter conditioned in circuit-closing position to maintain the release valve device 21 in a position to vent fluid under pressure from the brake cylinder regardless of changes in the rotative condition of the axle and wheels.

With the contact levers 74 of the switch device 67 again engaging each other due to the shifting of the flywheel 39 to a lagging position with respect to the axle 14, the magnet winding 126 of the magnet valve device 24 is of course again energized and communication between the brake cylinder 19 and connected section of the straight-air pipe 112 with the chamber 145 of the pressure switch 22 again established. However, such operation is without effect for direct communication between the chamber 145 and the straight-air pipe 112 is maintained past the unseated valve 137 of the pressure switch 22.

As the axle 14 and wheels 15 approach a rotative speed corresponding to car or rail speed, the rate of acceleration decreases below that sufficient to maintain the fly-wheel 39 in lagging position with respect to the axle 14, and consequently the fly-wheel 39 returns to normal rotative position with respect to the axle, with the result that the contact levers 74 of the switch device 67 are returned to their normal disengaged position and the electromagnet winding 126 of the magnet valve device 24 consequently deenergized.

The time required for the pressure in the brake cylinder to reduce sufficiently to permit the spring 143 of the pressure switch 22 to return the valve 137 into seated position and to disengage the switch member 136 from its associated contact fingers 144 is longer than that required for the axle 14 and wheels 15 to return to car or rail speed and thus the brakes associated with the slipping wheels are released and cannot be reapplied before the vehicle wheels and axles return to rail or car speed.

When the pressure in the brake cylinder 19 and the connected chamber 145 of the pressure switch 22 reduces to below the uniform low value of five pounds per square inch, which occurs at some time subsequent to the complete return of the axle and wheels to a speed corresponding to rail or car speed, the spring 143 returns the valve 137 to seated position and shifts the switch member 136 out of engagement with its associated contact fingers 144.

The separation of the switch member 136 of the pressure switch 22 from its associated contact fingers 144 results in the deenergization of the electromagnet winding 126 of the magnet valve device 23 and the consequent seating of the valve 125 thereof to close the venting communication from the chamber 119 of the release valve 21. The volume of the chamber 119, pipe 131 and chamber 129 of the magnet valve device 23 is relatively small and the size of the choke 121 in the piston 116 is such that chamber 119 becomes promptly charged with fluid under pressure supplied through choke 121 from the section of the straight-air pipe 112 connected to the brake valve 17 so that the spring 117 thus very promptly shifts the vent valve 114 to seated position to close the exhaust port 118 and restore the communication between the two sections of the straight-air pipe 112. Fluid under pressure is accordingly resupplied through the straight-air pipe 112 to the brake cylinder 19 to effect reapplication of the brakes associated with the wheels 15 and axle 14 because, as previously explained, the brake valve device 17 operates to maintain a pressure in the straight air pipe corresponding to the position of the operating handle 111 thereof out of its normal release position.

It is customary for the operator of a railway train to reduce the degree of application of the brakes as the speed of the train decreases. Accordingly the operator does not maintain the brake valve handle 111 in its original position but returns it toward release position as the speed of the train reduces. Consequently the pressure ultimately restored in the straight-air pipe 112 and brake cylinder 19 will not be as great as that which produced or caused the slipping of the axle and wheels 15 so that recurrence of wheel slipping is unlikely.

In the event that the degree of application of the brakes associated with the wheels 15 resulting from the restored pressure in the brake cylinder 19 is sufficient to again cause slipping of the wheels, the previous operation is repeated so that in no case are the car wheels 15 permitted to attain a locked state and slide.

When the car or train has been brought to a stop, the operator may shift the handle 111 of the brake valve 17 a maximum degree into the application zone to obtain a maximum degree of application of the brakes sufficient to hold the car or train on any grade condition encountered in service. With the car or train stationary, the contact levers 74 of the switch device 67 of the rotary inertia device 11 are disengaged and consequently the magnet winding 126 of the magnet valve device 24 is deenergized and the valve 125 thereof seated. Accordingly, since the valve 137 cannot be unseated solely in response to the maximum pressure acting thereon in the straight-air pipe 112 of the brake cylinder 19, no undesired release of the brakes will be effected. Should fluid under pressure leak past either the valve 137 or the valve 125 of the magnet valve device 24 to the chamber 145 while the car or train is stopped with the brakes applied, the loose fit of the piston 135 permits the release of such fluid under pressure to atmosphere past the piston to the atmospheric chamber 141. Accordingly, the undesired operation of the pressure switch 22 due to leakage of fluid under pressure into the chamber 145, and the consequent undesired release of the brakes cannot be effected.

When the operator desires to release the brakes prior to again starting the train, he merely turns the brake valve handle 111 to its release position. Fluid under pressure is accordingly released from the brake cylinder 19 through the straight-air pipe 112 to atmosphere at the brake valve, thereby completely releasing the brakes.

The pressure switch 25 is returned to circuit-opening position as the result of the reduction of the pressure in the straight-air pipe 112. Accordingly, if the rotary inertia device 11 is associated with the axle of a traction wheel and axle unit, the racing of the wheels due to excessive application of propulsion torque does not cause energization of the magnet winding 126 and the magnet valve device 24. With the fluid under pressure vented from the brake cylinder and the brakes accordingly released, no objectionable operation would result in any case from the engagement of the contact levers 74 caused by racing of the wheels, but the pressure switch 25 operates to prevent needless energization of the magnet winding 126 of the magnet valve device 24 and the consequent drain on battery 163.

It will be apparent that the insulating tip 73 on the operating plunger 72 of the rotary inertia device 11 prevents the grounding of the contact levers 74 and the consequent short-circuiting of the battery 163 upon engagement of the plunger 72 with one of the contact levers.

*Modified embodiment shown in Fig. 6*

Referring to Fig. 6, a modified embodiment of a rotary inertia device 211 is illustrated which is generally similar, in construction and adaptation to the rotary inertia device 11. To avoid duplication of description, corresponding parts in the two devices will be identified by the same reference numeral and in general only those specific differences with respect to the rotary inertia device 11 pointed out. Essentially the difference between the rotary inertia device 211 and the rotary inertia device 11 lies in the fact that the former is adapted to be secured to and removed from the end of the journal housing 13 as a unit which is not the case with the rotary inertia device 11. To this end, a plate 212 is secured to the outer end of the axle 14 as by a plurality of screws 213, the plate 212 having a slot 214 formed therein for receiving a close-fitting tongue 215, of similar configuration to the slot, on a coupling member 210. The coupling member 210 is further provided with a transverse slot 216 therein for receiving a projecting pair of spaced lugs 217 formed at the inner end of a spindle 42a corresponding to the spindle 42.

The flange 43 of the spindle 42a is spaced from the inner end of the spindle 42a to provide space for the support of the inner end of the spindle by a ball bearing unit 219 fixed in the central opening 221 of a wall 222 formed as an inwardly extending flange of the tubular casing 12a of the rotary inertia device 211. Adjacent the ball bearing unit 219, within the opening 221 of the wall 222, is a packing washer 223, of felt or other suitable material, adapted to closely surround the inner end of the spindle 42a to prevent the passage of liquid lubricant from the roller bearing compartment of the journal housing 13 along the spindle to the chamber 37a formed at the opposite side of the wall 222.

The outer end of the spindle 42a is rotatably supported by a ball bearing unit 224 fixed in a central opening 225 formed in an end or cover plate 226 which is secured to the outer end of the tubular casing 12a by a plurality of screws 227.

The fly-wheel 39 is contained within the chamber 37a formed between the wall 222 and the cover plate 226 and is rotatively supported on the spindle 42a as by a plurality of ball bearing units 41 in the same manner as in the rotary inertia device 11. A circular recess 79a is formed on the inner face of the fly-wheel 39 which is deeper than the corresponding recess 79 of the rotary inertia device 11 and the flange 43 of the spindle 42a is located within the recess 79a and cooperates with the triangular plate 81 associated with the fly-wheel 39 in the same manner as in the rotary inertia device 11. A pin 48a, riveted at a suitable point near the outer periphery of the flange 43, is provided in place of the pin 48 of the rotary inertia device 11. The pin 48a is held between spring biased stops 46 in exactly the same manner as is the pin 48 in the rotary inertia device 11.

Suitably secured as by screws or bolts, not shown, to the outer face of the cover plate 226 is a switch device 67a, similar to the switch device 67, and having two pivoted contact levers 74a arranged to be shifted into engagement with each other by a plunger 72 disposed in spindle 42a in the same manner as in the spindle 42.

An end cover 231 is secured to the outer face of the cover plate 226, as by a plurality of screws 232, to enclose the switch device 67a. A suitable opening 233 is provided in the end cover 231 through which the wires connected to the contact levers 74a of the switch device 67a may pass to the exterior of the casing. If desired, a suitable insulator corresponding to insulator 107 may be provided for supporting the wires in the opening 233 or the opening may be calked with a suitable substance to prevent the entry of dirt, cinders or dust under the end cover, which might interfere with the proper engagement of the contact levers 74a with each other.

In order to provide access to the cam elements 56 for the purpose of adjusting the tension of the springs 53 in the fly-wheel 39 without removing cover plate 226, the cover plate 226 is provided with a plurality of openings or holes 235, which may have disc-like covers 236 with securing spring flanges extending into the openings 235.

Like the casing 12 of the rotary inertia device 11, the casing 12a of the rotary inertia device 211 is provided with a suitable drainage port 108 covered by a fine mesh screen 109.

In operation, the rotary inertia device 211 functions in exactly the same manner as does the rotary inertia device 11 and accordingly it should not be necessary to repeat a description of such operation. It should be noted, however, that since the spindle 42a is supported by the wall 222 and the cover plate 226 of the rotary inertia device 211 and since the spindle 42a is, furthermore, readily withdrawn from the slot 216 in the coupling member 210 on the end of the axle 14, the entire rotary inertia device 211 may be removed as a unit merely by unscrewing the screws 31 that secure the flange 29 of the casing 12a to the journal housing 13. It will thus be seen that, if for some reason or other it is desired to remove one of the rotary inertia devices 211 and replace it by another, such operation should take but a few minutes. Furthermore, the removal and the installation of the device may be effected by relatively unskilled persons.

Summary

Summarizing, it will be seen that I have disclosed two embodiments of a rotary inertia device adapted to be driven directly from the axle on a car and having a casing adapted to be secured to the end of the axle journal in place of the conventional cover plate.

Both embodiments employ the same principle of construction, embodying an inertia element in the form of a fly-wheel adapted to be driven by the axle and having a resilient connection therewith whereby upon deceleration and acceleration of the axle in excess of a certain rate, as when the wheels fixed to the axle slip, the fly-wheel shifts rotatively relative to the axle successively in a leading and a lagging direction to effect the closing of a switch device.

In one embodiment, the spindle, on which the fly-wheel rotates, is secured directly to the end of the axle while the switch device is rotatively supported on the spindle and restrained against rotation by a connecting strap attached to the casing.

In the other embodiment, the spindle on which the fly-wheel rotates is supported independently of the axle within the casing of the rotary inertia device and has an interlocking connection through a coupling member with the axle. The switch device is supported by the casing entirely independently of the spindle on which the fly-wheel rotates.

In both embodiments, the casing of the rotary inertia device is formed to contain a suitable packing to prevent the entry of lubricating oil from the axle journal into the chamber containing the fly-wheel thus enabling the fly-wheel to rotate freely in air independently of the level of the lubricant in the journal housing.

In both embodiments, a switch device for controlling a single circuit is shown but it will be understood that any suitable number of contact levers, corresponding to contact levers 74 and 74a, may be provided, whereby a plurality of circuits may be controlled.

It will be evident that while I have disclosed only two specific forms of my invention, various omissions, additions or modifications may be made in the embodiments shown without departing from the spirit of my invention. It is accordingly not my intention to limit the scope of my invention except as it is necessitated by the scope of the prior art.

Having now described my invention, what I claim as new and desire to secure by Letters Patent, is:

1. A rotary inertia device of the type for registering the rotative condition of a vehicle wheel and axle unit, comprising a rotary element located at the end of the axle and arranged to be driven thereby, and a casing removably attached to the journal housing associated with the axle in place of the usual end cover for closing the open end of the journal and at the same time enclosing the parts of the rotary inertia device including the rotary element.

2. A rotary inertia device of the type adapted to register the rotative condition of a vehicle wheel and axle unit, comprising a casing and a rotary element entirely supported by said casing, said casing being arranged to be removably attached to the journal housing associated with the axle in place of the usual end cover and in a position locating the rotary element in coaxial alignment with the axle, and means connecting the rotary element to the axle to cause the rotary element to be driven by the axle.

3. A rotary inertia device of the type adapted to register the rotative condition of a vehicle wheel and axle unit, comprising a rotary element separably connected to the end of the axle, a rotary inertia element rotarily supported on the said rotary element, resilient means interposed between the rotary element and the rotary inertia element through which the rotary inertia element is driven by the rotary element, a switch device rotatably supported on said rotary element and having switch members operated in response to the relative rotary movement between the rotary element and rotary inertia element, a casing removably attached to the outer end of a journal casing associated with the axle in place of the usual end cover for enclosing the open open end of the journal and housing said rotary element, said rotary inertia element and said switch device, and means fixed to the casing preventing rotation of the switch device upon rotation of the rotary element.

4. A rotary inertia device of the type adapted to register the rotative condition of a vehicle wheel and axle unit, comprising a casing, a rotary element rotatably supported entirely by said casing, said casing being removably attached to the outer end of a journal casing associated with the axle in place of the usual end cover for closing the open end of the journal casing, said rotary element being located in coaxial alignment with the axle when the casing is attached to the journal casing, and a coupling member interlocking the rotary element and the axle, said rotary inertia device being installable and removable as a unit.

5. A rotary inertia device of the type adapted to register the rotative condition of a vehicle wheel and axle unit, comprising a tubular casing adapted to be removably attached to the outer end of a journal casing associated with the axle in place of the usual end cover thereof, said tubular casing having a flange extending radially inward and having a central opening therein through which the end of the axle extends, an annular packing interposed in the opening of said annular flange between the flange and the axle, a rotary element removably attached to the end of the axle, a rotary inertia element supported rotatably entirely on the said rotary element, resilient means interposed between the rotary element and rotary inertia element to provide a yielding driving connection through which the rotary inertia element is driven by the rotary element, a switch device having a supporting base rotatably supported on the rotary element and switch members operated by relative rotary movement between the rotary element and rotary inertia element, and a member fixed to the tubular casing for preventing rotation of the base of the switch device upon rotation of the rotary element.

6. A rotary inertia device of the type adapted to register the rotative condition of a vehicle wheel and axle unit, comprising a spindle having a flange removably attachable to the end of the axle, a fly-wheel rotatably supported on said spindle, said fly-wheel having an opening therein radially spaced from and in parallel relation to the longitudinal axis of the axle, a pin fixed to the axle and extending into said opening in the fly-wheel, resilient means carried by the fly-wheel and acting on opposite sides of said pin to provide a yielding driving connection between the axle and the fly-wheel, switch means having a base rotatably supported on the said spindle and having switch members adapted to be operated upon relative rotary movement between the fly-wheel and the axle, and means for preventing rotation of the switch device.

7. A rotary inertia device comprising a rotary driving element, a rotary inertia element rotatably supported on the driving element and having an opening therein spaced radially outwardly from the axis thereof and in parallel relation to the axis thereof on which it rotates, said rotary driving element having a projection which extends into said opening, a pair of spring biased stops carried by the rotary inertia element and urged into contact with opposite sides of said projection whereby to form a resilient driving connection between the driving element and the rotary inertia element, a member so constructed and arranged as to rotate with the rotary inertia element at all times and to be movable axially with respect to the rotary inertia element, means interposed between said member and the rotary driving element for producing axial movement of the said member upon relative rotary movement between the driving element and the rotary inertia element, and a switch device having contact members operated by movement of said member.

8. A rotary inertia device comprising a rotary driving element, a rotary inertia element, said rotary element having a projection which extends into the plane of rotation of the rotary inertia element, resilient means carried by the said rotary inertia element and arranged to be acted upon by the said projection to form a yielding driving connection between the rotary driving element and the inertia element, and rotary means carried on the rotary inertia element for varying the resistance of the resilient means to relative rotary movement between the rotary element and the inertia element, said rotary member having a plurality of notches therein, and spring biased means carried by the rotary inertia element adapted to engage in said notches to yieldingly hold said rotary member in its different rotary positions.

9. A rotary inertia device comprising a rotary driving element having a flange thereon in which are a plurality of shallow recesses of conical contour, a rotary inertia element, means providing a resilient yielding connection through which the rotary inertia element is driven by the rotary element and adapted to yieldingly permit relative movement between the rotary element and the inertia element, a member so constructed and arranged as to rotate with the rotary inertia element at all times and to be movable axially relative to the inertia element, said member having a plurality of shallow recesses of conical contour corresponding in number and location to the recesses in the flange of the said rotary element and complementary thereto, a plurality of elements interposed between the said flange and said member, one in the pocket formed by each of the complementary pairs of recesses, whereby upon relative rotary movement between the inertia element and the rotary element said member is urged in an axial direction, and control means adapted to be operated by axial movement of said member.

10. A rotary inertia device of the type adapted to register the rotative condition of a wheel and axle unit, comprising a tubular casing removably attachable to the outer end of a journal associated with the axle in substitution for the usual end cover therefor, said tubular casing having two spaced annular flanges extending radially inward and having aligned central openings therein, a spindle rotatively supported at opposite ends by the spaced flanges, a coupling member so constructed and arranged that when the casing is attached to or removed from the journal the spindle is automatically interlocked with or disengaged from the axle, a fly-wheel rotatively mounted on the spindle between the spaced flanges, means providing a resilient connection between the fly-wheel and the spindle which yieldingly permits relative rotary movement between the fly-wheel and the spindle, and a switch device carried by the outer of said annular flanges and having switch members adapted to be operated by relative rotary movement between the fly-wheel and the spindle.

11. A rotary inertia device comprising a shaft adapted to be rotarily driven, an inertia element carried by said shaft and adapted to move rotatively thereon, said inertia element having two intersecting bores one of which is parallel to the axis of said shaft and the other of which is disposed at an angle to the first said bore, a member fixed to the shaft and extending into the first said bore of the inertia element in a manner to permit limited relative movement between the inertia element and the shaft, a pair of spring-biased stops carried by the inertia element in the other of said bores and arranged on opposite sides of said member in contact therewith to yieldingly hold said inertia element in a certain normal position with respect to said shaft and to form a resilient driving connection between the said shaft and the inertia element, and a switch device operated in response to rotary movement between the inertia element and the said shaft out of their normal relative positions.

12. A rotary inertia device comprising a shaft adapted to be rotarily driven, an inertia element carried by said shaft and adapted to move rotatively thereon, said inertia element having two intersecting bores one of which is parallel to the axis of said shaft and the other of which is disposed at an angle to the first said bore, a member fixed to the shaft and extending into the first said bore of the inertia element in a manner to permit limited relative movement between the inertia element and the shaft, a pair of spring-biased stops carried by the inertia element in the other of said bores and arranged on opposite sides of said member in contact therewith to yieldingly hold said inertia element in a certain normal position with respect to said shaft and to form a resilient driving connection between the said shaft and the inertia element, means for varying the force with which the spring-biased stops resist rotary movement of the inertia element out of its normal position with respect to said shaft, and switch means operative in response to rotary movement of the inertia element with respect to the said shaft.

CLYDE C. FARMER.